United States Patent
Jansen (10) Patent No.: US 9,770,846 B2
(45) Date of Patent: Sep. 26, 2017

(54) METHOD FOR PRODUCING AND MONITORING AN OBJECT AT LEAST PARTIALLY MADE OF PLASTIC, AND COMPONENT

(75) Inventor: Klaus Jansen, Buxtehude (DE)

(73) Assignee: Thomas GmbH + Co. Technik + Innovation KG, Bremervörde (DE)

( * ) Notice: Subject to any disclaimer, the term of this patent is extended or adjusted under 35 U.S.C. 154(b) by 1255 days.

(21) Appl. No.: 13/816,233

(22) PCT Filed: Aug. 9, 2011

(86) PCT No.: PCT/EP2011/003977
§ 371 (c)(1),
(2), (4) Date: Jun. 3, 2013

(87) PCT Pub. No.: WO2012/019749
PCT Pub. Date: Feb. 16, 2012

(65) Prior Publication Data
US 2014/0031458 A1    Jan. 30, 2014

(30) Foreign Application Priority Data
Aug. 13, 2010   (DE) .................. 10 2010 034 386

(51) Int. Cl.
B29C 35/10    (2006.01)
B29C 70/52    (2006.01)
(Continued)

(52) U.S. Cl.
CPC .......... B29C 35/10 (2013.01); B29C 35/0266 (2013.01); B29C 35/0277 (2013.01);
(Continued)

(58) Field of Classification Search
CPC .. B29C 35/0272; B29C 35/08; B29C 35/0805
(Continued)

(56) References Cited

U.S. PATENT DOCUMENTS 5,665,444 A    9/1997    Eguchi
5,770,155 A *  6/1998    Dunphy .............. B29C 35/0288
                                                250/227.14
(Continued)

FOREIGN PATENT DOCUMENTS

DE    202007013755 U1    3/2008
EP           2000276 A2   12/2008
(Continued)

OTHER PUBLICATIONS

Cable, David. Imbedded Fiber Optic Pressure and Temperature Sensors Enable Cure Monitoring of Pultruded Composite Materials. Society of Manufacturing Engineers, Conference on Effective Manufacturing Methods of Pultrusion, Manhattan Beach, CA, May 9, 10, 1990. 6 pages.*

(Continued)

*Primary Examiner* — Atul P. Khare
(74) *Attorney, Agent, or Firm* — Laurence P. Colton; Smith Tempel Blaha LLC (57) ABSTRACT

A method for producing an object or component, which is at least partially formed from plastic, by supplying energy for solidifying the plastic of the object or component to the plastic to be solidified by at least one energy conductor, such as an optical fiber, in the component to be produced, and the solidification of the plastic can be accelerated by the direct energy introduction into the object or component to be produced.

7 Claims, 5 Drawing Sheets

(51) Int. Cl.
  *B29C 35/02* (2006.01)
  *B29C 43/58* (2006.01)
  *B29C 35/08* (2006.01)
(52) U.S. Cl.
  CPC .......... *B29C 35/0805* (2013.01); *B29C 70/52* (2013.01); *B29C 70/528* (2013.01); *B29C 70/521* (2013.01); *B29C 2035/0827* (2013.01); *B29C 2035/0838* (2013.01)
(58) Field of Classification Search
  USPC ........................................................ 264/495
  See application file for complete search history.

(56) References Cited

U.S. PATENT DOCUMENTS

| | | | | |
|---|---|---|---|---|
| 5,916,509 | A * | 6/1999 | Durhman | B29C 35/10 264/137 |
| 6,061,902 | A * | 5/2000 | Kalamkarov | H01B 15/005 29/33 M |
| 6,245,194 | B1 | 6/2001 | Olster | |
| 6,408,915 | B1 * | 6/2002 | Ballata | B29C 70/52 156/180 |
| 6,703,188 | B1 | 3/2004 | Kagami | |
| 6,835,679 | B2 * | 12/2004 | Bilanin | B29C 35/0272 250/493.1 |
| 8,779,022 | B2 * | 7/2014 | Deuchar Care | B29C 35/0266 40/547 |
| 2004/0021255 | A1 | 2/2004 | Bilanin | |
| 2004/0245677 | A1 * | 12/2004 | Marple | B29C 33/36 264/496 |
| 2005/0257956 | A1 | 11/2005 | Marshall | |
| 2008/0193744 | A1 * | 8/2008 | Fawdington | B29C 35/0272 428/332 |
| 2008/0306177 | A1 * | 12/2008 | Deuchar Care | B29C 35/0266 522/1 |

FOREIGN PATENT DOCUMENTS

| | | | |
|---|---|---|---|
| GB | 2310822 A * | 9/1997 | ............. B29C 70/44 |
| GB | 2423279 A | 8/2006 | |
| WO | 2011101269 A1 | 8/2011 | |

OTHER PUBLICATIONS

State Intellectual Property Office of the People's Republic of China, Notification of First Office Action (on related patent application), Sep. 3, 2014 (cites only references already submitted in IDS of Feb. 10, 2013).
Nobuo Takeda, Embedded Fiber Optics Shed Light on Aircraft Damage, Spie Newsroom, (Jan. 1, 2008).
Eric Udd et al., Failure Mechanisms of Fiber Optic Sensors Placed in Composite Materials, Retrieved from Internet http://www.bluerr.com/papers/brr-2005_spie_vo15758_p409.pdf (Dec. 1, 2005).
Glissic B et al., Integration of Long-Gage Fiber Optic Sensor Into a Fiber-Reinforced Composite Sensing Tape, Proceedings of SPIE, SPIE, US, vol. 5050, pp. 179-186 (Jan. 1, 2003).

* cited by examiner

METHOD FOR PRODUCING AND MONITORING AN OBJECT AT LEAST PARTIALLY MADE OF PLASTIC, AND COMPONENT

The invention relates to a method for producing an object, which is at least partially formed from plastic, comprising solidifying the plastic by introducing energy.

Plastic objects, for example, profiles or components, either completely consist of plastic or—in the majority of cases—consist of a matrix system made of plastic and at least one reinforcement embedded therein, for example, reinforcing fibers and/or strands. In order to produce such objects discontinuously or continuously, for example, by pultrusion, the plastic must be solidified. For this purpose, the plastic or the matrix system, respectively, is converted during the production process from a liquid state or a state which can be molded in another manner into a solid state. Energy is required for this purpose, which can be thermal energy and/or electromagnetic radiant energy, depending on the matrix system used.

Above all in the case of objects, in particular components or profiles, having comparatively large cross sections or significant cross-sectional variations, it is not only necessary to supply an appropriate amount of energy, but rather the energy must reach the entire cross section of the object up into the core region or center. Heretofore, it has been typical to supply the energy in the component to be produced by means of a heated mold. In the case of large components, in particular those having larger cross sections or strong cross-sectional variations, of course, it requires a certain amount of time until the energy, which is supplied from the outside from the heated mold to the plastic of the object to be produced, also reaches the interior of the object up to its core. Long production times are accordingly the result. In addition, the supply of energy only from the outside results, in the case of objects having large thicknesses or cross-sectional variations, respectively, in uncontrollable shrinking of the matrix system, which can result in undesired deformations of the component and tensions therein.

In the case of known objects, such as in particular components and profiles having a matrix structure, i.e., reinforced plastic, there is no possibility of checking the state of the object (above all its load). However, there are many applications in which the state and/or the load are to be ascertained as simply as possible during usage or operation.

The invention is concerned with the improved, in particular higher-performance production of plastic objects, preferably reinforcements of plastic objects, and/or the monitoring (in particular the supervision and checking) of objects made of reinforced or else non-reinforced plastic.

The measures of claim 1 comprise a method for achieving this object. According to this method, at least one energy conductor is used for solidifying the plastic, in particular the matrix made of plastic and reinforcements in the case of reinforced objects, wherein the respective energy conductor is located in the object to be produced. The energy required for solidifying the plastic or the matrix can be transported directly into the interior of the object by the at least one energy conductor, and specifically if the at least one energy conductor is appropriately arranged in the cross section of the object. Above all if multiple energy conductors are used, a targeted supply of energy can be performed to the point of the object, in relation to the cross section, where the energy is predominantly required for solidifying the plastic or the matrix, respectively. The method according to the invention allows more direct supply of the energy, which is not the case in the case of the known energy supply by a heated mold. The invention thus allows more rapid production of objects made of plastic, with or without at least one reinforcement. In addition, however, energy can also still be supplied via the mold to the object if necessary.

It is preferably provided that the at least one energy conductor is introduced into the object to be produced. This can be performed permanently or also only during the production. For this purpose, it is preferably provided that the at least one energy conductor is embedded entirely or partially in the object to be produced. In the case of objects provided with reinforcements, the at least one energy conductor can be part of the matrix. Through the embedding of the at least one energy conductor in the object, the respective energy conductor can transport the energy, which is required for solidifying the plastic or the matrix, directly and immediately into the object to be produced. The energy can thus be transported where it is required for the optimum uniform solidification of the plastic or the matrix. The plastic or the matrix, respectively, may be solidified rapidly and homogeneously through the direct, targeted introduction of the energy into the object.

Furthermore, it is preferably provided that the at least one energy conductor discharges the energy transported thereby via a free end, preferably a free end face, to the plastic or the matrix, respectively, of the object to be produced. The energy can thus be supplied by each energy conductor to the plastic or the matrix, respectively, at a specific point in relation to the cross section and the length of the object to be produced. In order to avoid very high local energy densities in this case, it is conceivable to provide a scattering body at the end of the respective energy conductor. A larger area is thus available for transmitting the energy, which is transported through the respective energy conductor into the interior of the object, to the plastic or the matrix to be solidified.

An advantageous refinement of the method provides that the energy, which is introduced by the at least one energy conductor into the object to be produced, is emitted in a distributed manner from the respective energy conductor. This can be performed, for example, by undulation and/or scattering on structures of the at least one energy conductor. The scattering can be induced in various ways, for example, by a corresponding structure of the sheath of the preferably strand-shaped energy conductor. Thus, not only the end face of the respective energy conductor is available for the transfer of the energy to the plastic or the matrix, but rather also the lateral surface. By embedding a corresponding length of the energy conductor in the object to be produced, the area of the energy conductor embedded in the object to be produced can be adapted in accordance with the requirements, and influence can thus be taken on the effectiveness with which the respective energy conductor discharges energy to the plastic or the matrix to be solidified.

A preferred embodiment of the method provides that optical energy conductors are used as the energy conductor. For example, these are optical fibers, such as glass or polymer fibers, in this case. In this manner, the energy is transported optically, specifically as extremely high-frequency electromagnetic radiation, in particular from at least one laser, into the object to be produced and is coupled at contact or transfer surfaces of the optical fibers into the plastic or the matrix to be solidified.

In a conceivable embodiment of the method, it is provided that the at least one optical fiber is only used for supplying energy into the object to be produced. However, the respective optical fiber does not remain in the object to be produced. In the case of this procedure, the at least one optical fiber is preferably positioned in the object to be produced in such a manner that its free end is located shortly in front of the point at which the plastic or the matrix solidifies. It is thus ensured that the respective optical fiber used for the energy transport is not embedded in the solidified plastic and thus can no longer be removed from the object to be produced. If the respective optical fiber used for energy conduction does not remain in the object to be produced, the procedure is either that, in the case of continuous processes, the object to be produced is continuously moved away over the respective stationary optical fiber or, in the case of discontinuous processes, the respective optical fiber used for the energy conduction is withdrawn from the object to be produced before the solidification of the plastic or the matrix.

Another alternative embodiment of the method provides that at least a part of the reinforcement of the object to be produced, in particular its matrix, is formed by the at least one optical fiber. The at least one optical fiber used for the energy conduction then also remains permanently in the object to be produced. In this case, the at least one optical fiber used for the energy conduction is moved further continuously in the production direction with the object, also in the case of continuous production processes, for example, in the case of pultrusion. In the case of this procedure, each optical fiber used for energy conduction has a double function, in that, on the one hand, it introduces at least a part of the energy, which is required for solidifying the plastic or the matrix, directly into the plastic or the matrix and, on the other hand, it forms a part of the reinforcement, that is the matrix, of the component, profile, or another object to be produced.

An advantageous further embodiment of the method provides that the at least one optical fiber used for energy conduction is also used for supervising the object produced. The at least one optical fiber, which is used during the production of the object for energy transport into the interior of the object, is also used in this embodiment of the method for monitoring the finished object, in particular in operation or use thereof. The respective optical fiber thus has a multiple function, in that it also permits observation of the finished object. Without any type of changes to the object, the optical fibers, which are used during the production of the object for solidifying the plastic, in particular optical waveguides, can be used to carry out supervision, checks, and/or diagnoses on the finished object, also during its operation if necessary.

The measures of claim 10 comprise a further method for achieving the object mentioned at the beginning. For this purpose, it is provided that at least the state and/or the load of the object is ascertained by means of at least one reinforcement strand. In this manner, the object does not have to be structurally changed in order to supervise, check, and/or diagnose it. Above all, through the use of at least one reinforcement strand, the mentioned monitoring measures can be performed at any time, even during the use or operation of the object.

A refinement of the method provides that at least one reinforcement strand, which is designed as an optical fiber, is used to perform the monitoring on the object, preferably by light conduction. The optical fibers used for monitoring purposes, which can be glass or polymer fibers, for example, are also typical materials for reinforcements, so that the at least one optical fiber, which is used for monitoring purposes, can simultaneously form at least a part of the reinforcement, without strength properties of the reinforcement thus being impaired.

The features of claim 12 comprise a component which achieves the object of the invention. Accordingly, the component is provided with at least one optical conductor. This optical conductor is embedded in the component, in that it is part of the matrix of the component. The at least one optical conductor allows information, which is used for monitoring purposes, to be conducted to the outside from the interior of the component, in order to be analyzed outside the component.

It is preferably provided to form the at least one optical conductor, which is for ascertaining information about the state and/or the load of the component, a part of the reinforcement of the component. The at least one optical conductor is then part of the matrix made of plastic and reinforcement strands of the plastic part. The at least one optical conductor then has a multiple function, which is used, specifically, on the one hand, for reinforcing the component and, on the other hand, for monitoring purposes. The optical fibers, which are used for checking, observation, and/or diagnostic purposes, can optionally also be used for transporting energy for solidifying the material of the component into the component.

A preferred embodiment of the component provides that the at least one optical conductor is formed as at least one optical fiber, for example, a glass or polymer fiber. Such optical fibers are suitable in particular also for forming reinforcements of components formed from plastic. The optical fiber is then part of the matrix of the component. The respective optical fiber thus does not need to be provided as an additional component in the matrix of the component. In addition, the respective optical fiber, which is used for monitoring purposes, is housed protected in the interior of the component, in particular the matrix. Above all, the respective optical fiber or strand, which is made of typical reinforcement materials, does not form a foreign body within the matrix of the object, which could impair the properties of the object.

Preferred exemplary embodiments of the invention are explained hereafter on the basis of the drawing. In the drawing.

FIGS. 1 to 4 show a simplified view of an object. In the exemplary embodiment shown, the object is a component 10 or a profile. The component 10 or another object can have arbitrary shapes and designs, in particular arbitrary cross sections. Above all, the component 10 can be both linear and also curved.

The component 10 or another object to be produced according to the invention is either formed only from plastic or from a matrix made of plastic or at least one reinforcement. The plastic can be any arbitrary plastics, in particular both duroplastics and also thermoplastics, which can be solidified using energy which can be supplied. In the case of thermoplastics, the plastic is melted to mold the component 10 and subsequently solidified, wherein the solidification is intensified, above all accelerated, by supplying energy. In the case of duroplastics, components, which are mixed to form a deformable starting material, are cured by supplying energy.

The at least one reinforcement can be any arbitrary typical reinforcement made of strands, nonwoven materials, fabrics, or the like. The component 10 can have both at least one longitudinal reinforcement and at least one transverse reinforcement. Alternatively or additionally, at least one reinforcement can be provided in arbitrary other directions in the component 10 to form the matrix. The at least one reinforcement can be formed from arbitrary materials, in particular high-strength materials such as strands or fibers which have high textile strength and little stretching. The at least one reinforcement is typically completely embedded in the plastic of the component 10.

Figure 1:
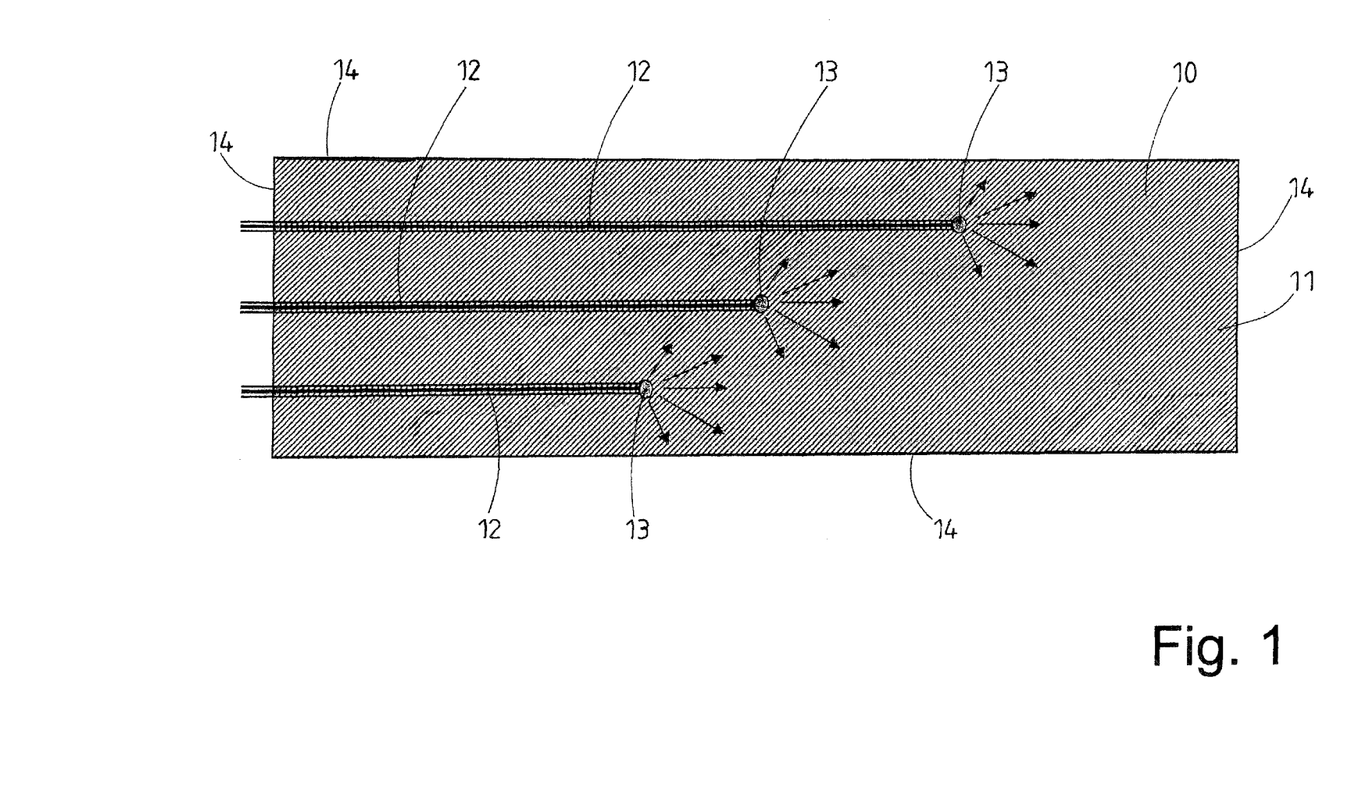
FIG. 1 shows a longitudinal section through an object having three energy conductors.
Figure 2:
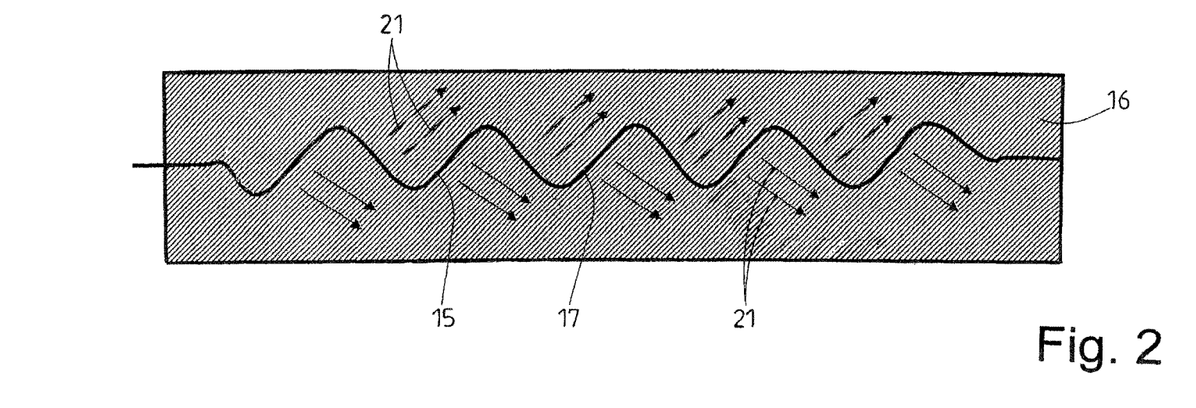
FIG. 2 shows a longitudinal section through an object similar to FIG. 1 having an alternative energy conductor.
Figure 3:
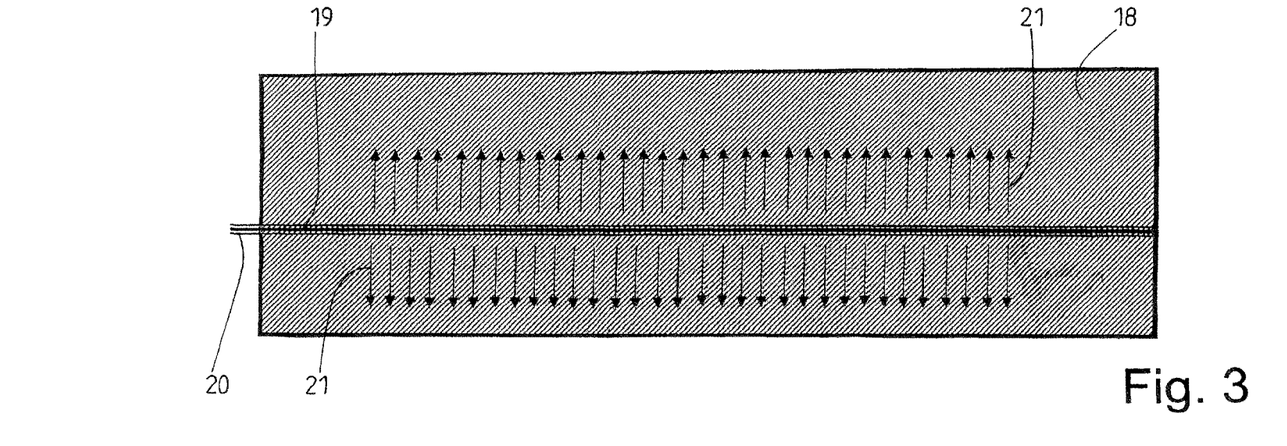
FIG. 3 shows a longitudinal section through an object similar to FIGS. 1 and 2 having an alternative energy conductor.

For the exemplary embodiments described hereafter, in particular from FIGS. 1 to 3, it is presumed that the component 10 is formed from a matrix 11 made of plastic having multiple arbitrary reinforcements embedded therein. The reinforcements in the plastic of the matrix 11 are not shown in FIGS. 1 to 3 for reasons of better clarity.

It is provided according to the invention that the plastic of the matrix 11 is solidified and/or cured entirely or at least partially by at least one energy conductor, in particular at least one energy conductor in the matrix 11. For this purpose, at least one energy conductor is embedded in the component 10, either permanently or temporarily, i.e., only during the production of the component 10.

FIG. 1 shows the production of the component 10 having three energy conductors embedded therein. The energy conductors are designed as optical conductors in the exemplary embodiment shown. In the exemplary embodiment shown, the optical conductors are optical fibers 12 or else optical strands. The optical fibers 12 can be glass or polymer fibers, but can also consist of other materials which conduct energy in an optical manner. The number of the optical fibers 12 in the component 10 is not restricted to the exemplary embodiment shown in the figure, having three parallel linear optical fibers 12. Depending on the size and type of the component 10, the number of the optical fibers 12 can be greater or less. It is also conceivable that only a single optical fiber 12 for solidifying the plastic of the matrix 11 is provided in the component 10. All optical fibers 12 are completely embedded in the component 10, i.e., are located within the cross section of the component 10, and spaced apart from the walls 14 thereof. The optical fibers 12 are shown greatly enlarged in FIG. 1 and also in the remaining figures for reasons of better recognizability. The optical fibers 12 are actually substantially thinner. The diameters of the optical fibers 12, which have equal diameters in the exemplary embodiment of FIG. 1, but can also have different diameters, in order to supply more or less energy to specific points of the component 10, preferably correspond to the diameter of the fibers or strands of the reinforcement in the matrix 11. Thus, for example, the diameters of the optical fibers 12 can move in the millimeter range, but can also be somewhat greater or less than 1 mm. Typical diameters of the optical fibers 12 are between 0.1 mm and 2 mm.

The optical fibers 12 are arranged distributed in the cross section of the component 10 so they extend linearly and in parallel over the cross section of the component 10 in the exemplary embodiment of FIG. 1. The optical fibers 12 extend in the longitudinal direction of the component 10. In the exemplary embodiment shown, the three optical fibers 12 are of different lengths, in that their ends, preferably their free cross sections 13, end at different points in relation to the longitudinal direction of the component. In this manner, the energy which is introduced by the optical fibers 12 into the component 10 is uniformly distributed.

The optical fibers 12 are introduced from the outside into the component 10. The optical fibers 12 can thus be supplied outside the component 10 with energy for solidifying the plastic of the matrix 11, specifically by at least one suitable energy source. High-frequency, preferably extremely high-frequency electromagnetic beams, for example, lasers, are used as the energy for solidifying the plastic of the matrix 11. It is also conceivable to supply thermal energy to the component 10 via the optical fibers 12.

The externally supplied energy is introduced via the optical fibers 12 along the length thereof into the component 10. The optical fibers 12, which are embedded in the component 10, are thus used for the energy transport into the interior of the component 10. The energy transported by the optical fibers 12 into the interior of the component 10 is supplied to the plastic of the matrix 11 or transferred to the plastic, respectively, at the ends of the optical fibers 12. The energy transported by the optical fibers 12 into the component 10 therefore exits at the free cross sections 13 of the optical fibers 12, whereby it is emitted in the component 10 onto the matrix 11 and thus solidifies the plastic thereof.

The component 10 shown in FIG. 1 is a body of finite length, which receives its desired contour in a mold (not shown). The component 10 is therefore produced discontinuously. In this mode of production of the component 10, the optical fibers 12 for energy transmission are only temporarily located in the component 10. The optical fibers 12 are therefore withdrawn from the component 10 before the complete finishing thereof. For this purpose, it is provided that the optical fibers 12 only remain in the component 10 as long as the plastic for the formation thereof is not yet completely solidified or cured, respectively. It is conceivable that the optical fibers 12 are withdrawn from the matrix 11 with progressive solidification of the plastic, wherein the solidification points of the plastic, as the optical fibers 12 are withdrawn from the component 10, are always located before the free cross sections 13 of the optical fibers 12, so that the optical fibers do not "freeze" in the solidified plastic.

However, it is also conceivable that the optical fibers 12 remain in the component 10. The optical fibers 12 then form at least a part of the reinforcement of the component 10 and therefore also a part of the matrix 11 thereof.

Furthermore, the invention provides using the optical fibers 12, which remain in the finished component 10, for monitoring purposes. The optical fibers 12 then have a multiple function, in that they are first used for introducing the energy, which is used to solidify the plastic of the matrix 11, into the interior of the component 10 during the production of the component 10, they form at least a part of the reinforcement, and they can be used after the finishing of the component 10 for monitoring purposes. The monitoring allows the component 10 to be supervised, checked, and/or diagnosed at any time, in particular also during its use. For example, supervision of the state or the load of the component 10 can be performed using at least one optical fiber 12. For the purposes of this supervision, the respective optical fiber 12 transmits corresponding signals from the interior of the component 10 to a supervision device arranged outside thereof. Various signals, which are to be transmitted by the optical fibers 12, can be used for the supervision. Above all, it is provided that the supervision is performed visually, in that images from the interior of the component 10 are made visible on a display screen outside the component 10.

The present monitoring method can also be performed on the component 10, to which no energy has been supplied via the optical fibers 12 during the production. In such a case, the optical fibers 12 are preferably only used for forming a part of the reinforcement in the matrix 11 and for monitoring the state and/or the load of the component 10.

In the exemplary embodiment of FIG. 2, an energy conductor or light conductor, specifically an optical fiber 15 again, extends continuously over the entire length of the component 16. This component 16 can fundamentally be constructed precisely like the component 10 of FIG. 1. The single optical fiber 15 extends in the longitudinal direction of the component 16 in a serpentine line lengthwise through the component 16, preferably through the center. Linear regions, which extend diagonally to the longitudinal axis of the component 16, preferably at 45°, are located between the upper and lower reversal points of the optical fiber 15, which extends in a serpentine line. However, it is also conceivable that the optical fiber 15 in the component 16 has other nonlinear courses, for example, along a sinusoidal line. Because the optical fiber 15 extends uninterrupted lengthwise through the component 16, it does not have a free end in the component. Therefore, the energy is released here by a distributed emission on the lateral surface 17 of the optical fiber 15. In other words, the energy which is transported by the optical fiber 15 into the component 16 exits from the optical fiber distributed through the lateral surface 17, in particular perpendicularly to the lateral surface 17, as indicated by arrows in FIG. 2. In the case of the optical fiber 15 shown in FIG. 2, the energy transported through the component 16 by the optical fiber is therefore discharged to the plastic or the matrix 11 of the component 16 or introduced into the matrix 11 through undulation.

Notwithstanding the illustration of FIG. 2, multiple optical fibers 15, which extend nonlinearly, in a serpentine line in particular, may also be arranged in the component 16, the optical fibers then being distributed on the cross section of the component 16 so that it is uniformly supplied with energy by the optical fibers 15. In the case of a symmetrical profile of the component 16, the optical fibers 15 are preferably embedded in the plastic or the matrix 11 of the component 16 so they are distributed uniformly or symmetrically, respectively, over the cross section.

The continuous arrangement of at least one looped optical fiber 15 in the component 16, which is shown in FIG. 2, is suitable both for the discontinuous production of the component 16 having a finite length and also for the continuous production of a strand-shaped component 16 of arbitrary length. The energy is then introduced into the optical fiber 15 in such a manner that the same energy is emitted from the lateral surface 17 substantially only in the initial region of the component 16, because the plastic is not yet solidified or the matrix 11 is not yet cured, respectively. The at least one optical fiber 15 remains in the component 16 in this embodiment of the invention. Therefore, the at least one optical fiber 15 is not only used during the production to supply energy to the plastic of the component 16 to be cured. Because the at least one optical fiber 15 remains in the component 16, it is also used for the reinforcement thereof, in that it forms the entire reinforcement or only at least a part of the reinforcement of the component 16. In addition, the at least one optical fiber 15 can also be used for monitoring, i.e., for supervising the state or the load of the finished component 10, also during the usage thereof.

FIG. 3 shows an exemplary embodiment of the invention, in which a continuous, linear energy conductor is arranged in the continuously or discontinuously produced component 18, which is constructed according to the component 10 of FIG. 1, for example. In the exemplary embodiment shown, the energy conductor is again formed as an optical fiber 19. Multiple optical fibers 19 can also be arranged distributed in the component 18.

The energy transported by the optical fiber 19 into the component 18 is emitted perpendicularly to the lateral surface 20 of the optical fiber 19 and is introduced at the same time into the plastic to be solidified of the matrix 11 of the component 18. The radiation direction 21 of the energy discharged from the optical fiber 19 at the lateral surface 20 is symbolized by arrows in FIG. 3. Through intentional disturbances in the lateral surface 20, for example, by roughening the lateral surface 20, exit surfaces result for the energy from the optical fiber 19. Because of irregular disturbances or irregularities of the roughening of the lateral surface 20, it is conceivable that the radiation direction 21 does not exit perpendicularly to the lateral surface 20 from the optical fiber 19, as shown in an idealized manner in FIG. 3, but rather slightly diagonally thereto in different directions, wherein the radiation directions 21 can also intersect.

FIGS. 5 to 8 show various embodiments of optical fibers. For example, the optical fibers 12, 15, and 19 of FIGS. 1 to 3 can thus be formed.

Figure 5:
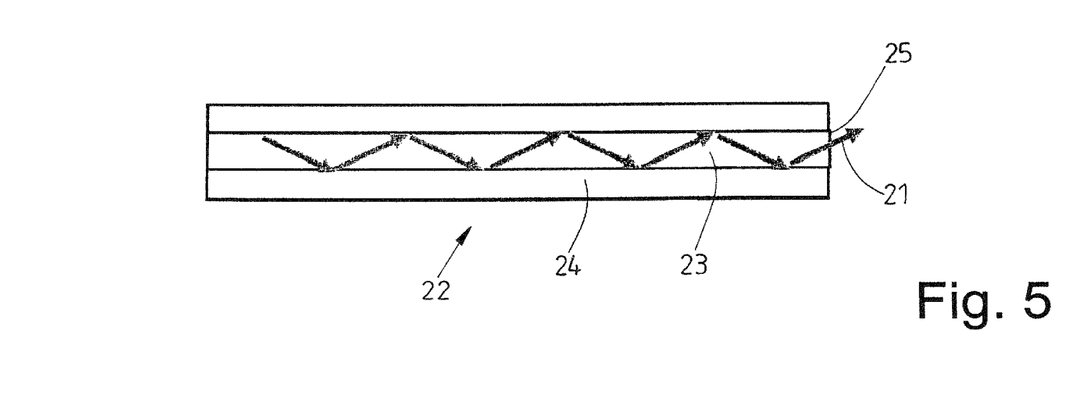
FIG. 5 shows an enlarged schematic sketch of an energy conductor in longitudinal section.

The optical fiber 22 of FIG. 5 has an inner core 23 and an outer sheath 24. At least the core 23 is formed as an optical conductor, for example, as a glass fiber or polyamide fiber. The sheath 24 which encloses the core 23 is formed in the exemplary embodiment of FIG. 5 so that it does not transmit energy. The energy is then transported further in the core 23 in the radiation direction 21 to the free end face 25 at the free end of the optical fiber 22 or the optical conductor, respectively. The energy, for example, extremely high-frequency electromagnetic radiation, which is generated by at least one laser, exits from the core 23 at the end face 25, from which the energy is absorbed by the plastic or the matrix enclosing the optical fiber 22, in order to solidify the plastic or the matrix, respectively.

Figure 6:
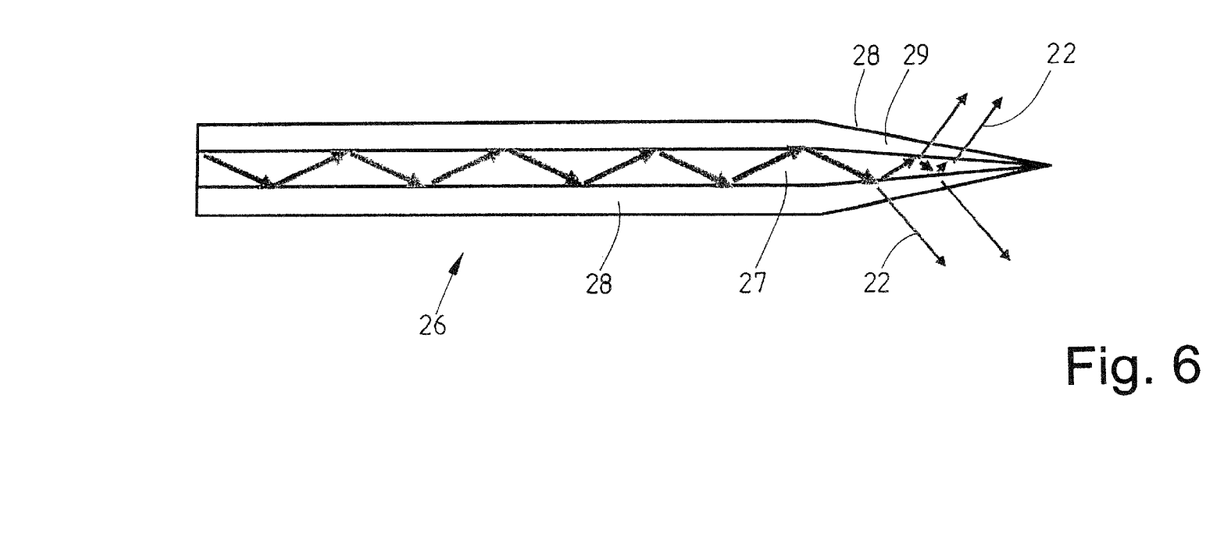
FIG. 6 shows an alternative embodiment of an energy conductor in a view similar to FIG. 5.

FIG. 6 shows an optical fiber 26, which is formed and constructed like the optical fiber 22, specifically it has an inner core 27 and a sheath 28 which encloses this core. In contrast to the exemplary embodiment of FIG. 5, the optical fiber 26 does not have a blunt end. The end is rather designed as tapered, preferably conically tapered, so that a taper 29 results at the free end of the optical fiber 26. The energy which is transported through the core 27 in the longitudinal direction of the optical fiber 26 to the taper 29 exits through the conical outer surface from the taper 29, specifically its sheath 28, and slightly inclined to the conical outer surface of the taper 29. The energy thus exits in the radial radiation direction 21 from the conical lateral surface of the taper 29. The energy is then introduced in a radially oriented manner from the taper 29 into the plastic or the matrix 11 to be cured.

Figure 7:
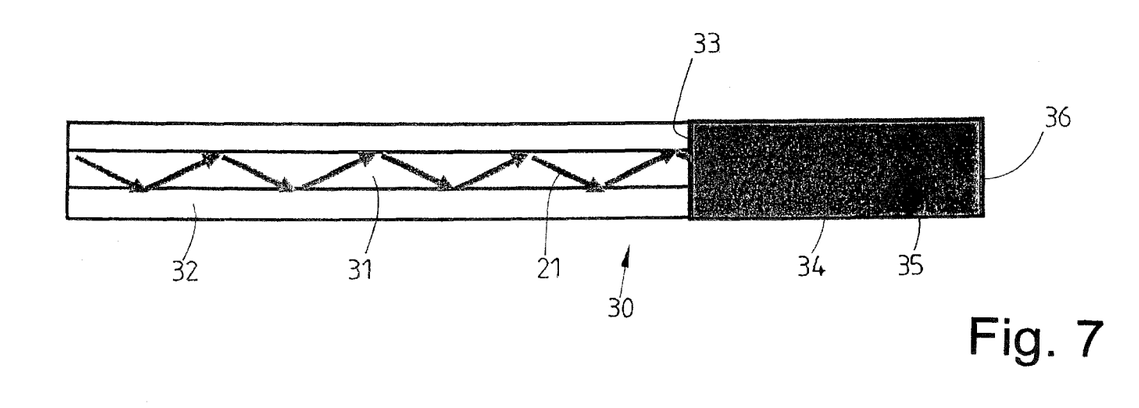
FIG. 7 shows an alternative view of an energy conductor similar to FIGS. 5 and 6.

FIG. 7 shows an exemplary embodiment of an optical fiber 30, which is formed like the optical fibers 22 and 26 from an inner core 31 and a sheath 32, which encloses it. A scattering body 34 is arranged on the free blunt end 33 of the optical fiber 30. This scattering body can be designed as an absorption or florescence body. The energy introduced through the core 31 into the end face of the scattering body 34, which is fastened in front of the optical fiber 30, is introduced via the entire peripheral surface 35 and the free end face 36 of the scattering body 34 into the plastic or the matrix 11 surrounding it. In this manner, the energy is supplied in a uniformly distributed or diffuse manner to the plastic to be solidified, whereby local energy densities are avoided and thus relatively large quantities of energy can be supplied via the scattering body 34 to the plastic or the matrix 11 to be solidified, without impairments of the plastic or the matrix 11 occurring due to excessively high energy densities.

Figure 8:
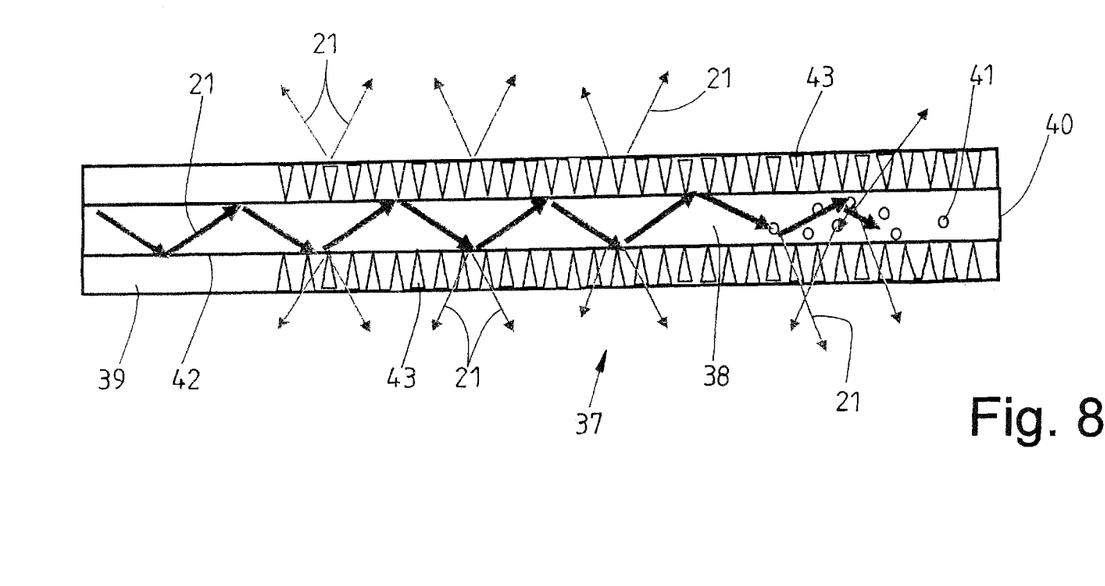
FIG. 8 shows a further exemplary embodiment of an energy conductor in a view similar to FIGS. 5 to 7.

The optical fiber 37 of FIG. 8 also has a core 38 and a sheath 39. The energy is transported through the core 38 to the free end 40 of the optical fiber 37. Scattering means 41 are embedded in the core 38. The scattering means 41 can be small particles or bodies having different material properties than the core 38, or also cavities or flaws in the core 38. In this manner, scattering of the energy in the core 38 occurs, which is also oriented outward toward the envelope surface 42 of the core 38. In the optical fiber 37, the sheath 39 is also designed for scattering the energy. For this purpose, the sheath 39 is either provided with scattering means like the core 38 or it has structures 43. As a result of the structures 43, the sheath 39 represents an absorption or fluorescence layer which encloses the core 38, and through which the energy is emitted outward and leaves the optical fiber 37 in various radial directions. The energy then exits from the optical fiber 37 as energy beams, which are preferably distributed uniformly around the optical fiber 37. These energy beams are absorbed by the plastic or the matrix 11 of a component and the plastic or the matrix 11 cures or solidifies at this time. In addition, energy can also exit from the optical fiber 37 via the free end 40 of at least the core 38.

Notwithstanding the exemplary embodiment of FIG. 8, a taper 29 or a scattering body 34 can be arranged at the free end 40 of the optical fiber 37.

Figure 4:
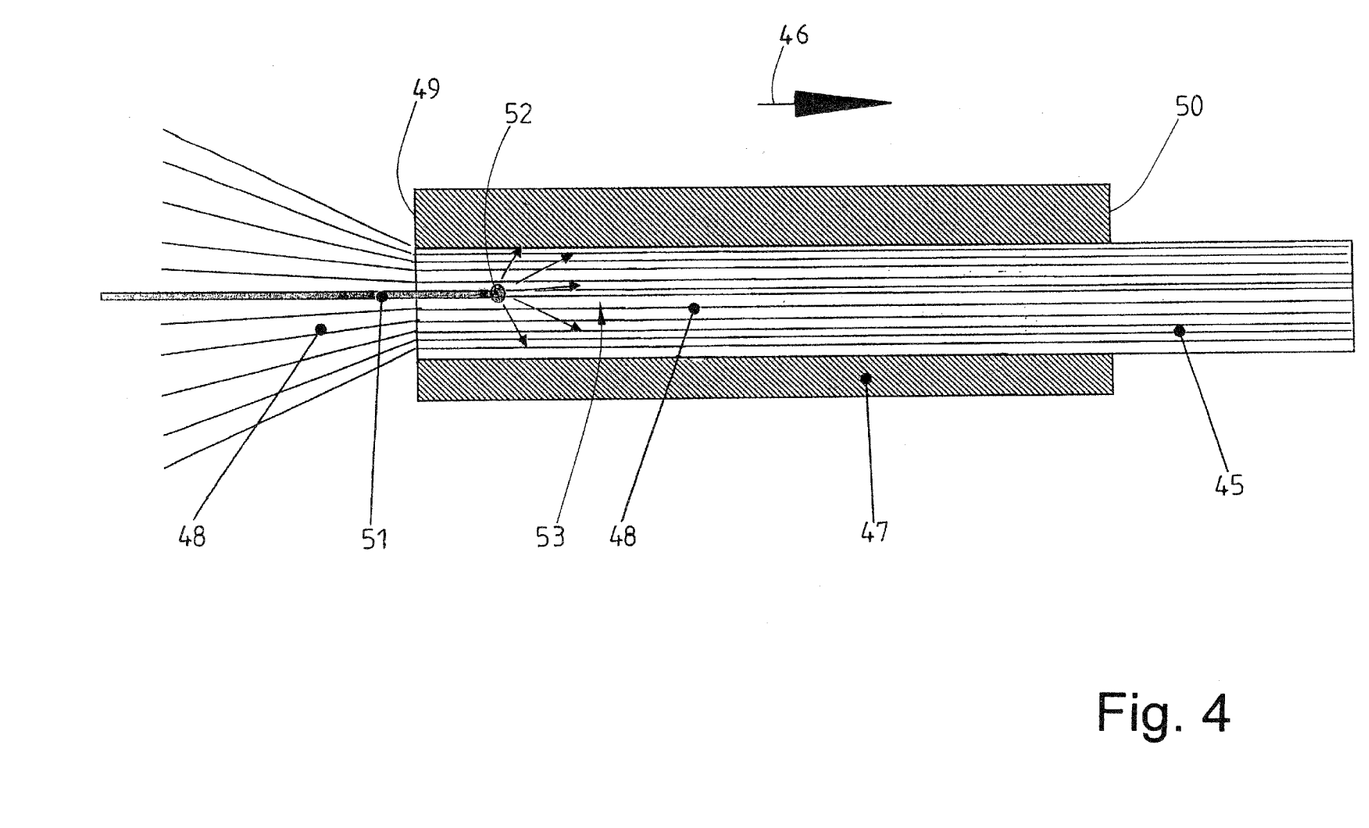
FIG. 4 shows a schematic sketch of a device for the production of an object according to the invention.

FIG. 4 illustrates the invention in conjunction with the continuous production of an oblong, strand-shaped component 45. One possibility for continuously producing such a long component 45, in particular a profile, is the pultrusion which is schematically shown in FIG. 4. The component 45 is drawn through a stationary mold 47 in the manufacturing direction 46 during the production. The preferably one-piece mold 47 completely encloses the profile of the component 45 to be produced.

The component 45 is formed from a matrix made of reinforcement fibers 48 and plastic which embeds them, in particular a duroplastic. In the exemplary embodiment shown, the reinforcement fibers 48 extend continuously in the manufacturing direction 46 through the component 45. It is also conceivable to provide other or additional reinforcements (not shown), for example, transverse reinforcements.

The reinforcement fibers 48 are guided into the mold 47 at the mold beginning 49 in a manner which is typical for the pultrusion method. The reinforcement fibers 48 extend uninterrupted and parallel to one another longitudinally through the mold 47. The finished component 45 exits from the mold 47 at the mold end 50 located in front in the manufacturing direction 46, wherein the component 45 is completely solidified or cured.

The curing or solidification of the plastic of the component 45 is performed by supplying energy. A part of the energy can be introduced into the component 45 via the outer lateral surface by heating the mold 47.

The invention provides introducing additional energy, but optionally also all of the energy (the mold 47 then does not need to be heated) from the interior into the component 45 to be produced, in order to accelerate the curing or solidification of the plastic or the matrix 11 of the component 45, respectively. For this purpose, an optical fiber 51, which is used as an energy conductor, is provided in the exemplary embodiment shown. The linear optical fiber 51, which is located in the profile center, preferably on the longitudinal axis of the component 45, is shown enlarged for illustration purposes in FIG. 4. In principle, the diameter of the optical fiber 51 does not need to be greater than the diameter of the reinforcement fibers 48. However, it is also conceivable to form the optical fiber 51 with a slightly greater diameter than the reinforcement fibers 48, to increase the energy flow through the optical fiber 51.

The optical fiber 51 is, like the mold 47, held fixed in place by suitable means. The optical fiber 51 is thus stationary in relation to the mold 47. An end 52 of the optical fiber 51, which is located in the interior of the mold 47, thus does not change its position in relation to the mold 47. In this manner, the optical fiber 51 does not remain in the component 45 to be produced. The free end 52 of the optical fiber 51 is located approximately centrally in the interior of the component 45 to be produced, specifically at a point where the plastic or the matrix 11 is not yet cured or solidified. This point forms a gel zone 53 of the duroplastic, which is located in front of the end 52 of the optical fiber 51 viewed in the manufacturing direction 46.

The end 52 of the optical fiber 51 in the mold 47 or in the component 45 to be produced, respectively, can be formed as shown in FIGS. 5 to 7. However, it is also conceivable to form the optical fiber 51 according to FIG. 8, so that the energy transported through the optical fiber 51 into the component 47 to be produced not only exits through the end face at the end 52 of the optical fiber 51, but rather also laterally. In this manner, relatively large energy rates can be transmitted, without local heating of the plastic or the matrix 11, from the optical fiber 51 to the plastic or the matrix to produce the component 45, whereby rapid solidification or curing of the component 45 is induced.

Notwithstanding the exemplary embodiment in FIG. 4, it is also conceivable to provide multiple optical fibers 51, which protrude with their ends 52 into the mold 47, as shown in FIG. 1, for example.

LIST OF REFERENCE NUMERALS 10 component
11 matrix
12 optical fiber
13 free cross section
14 wall
15 optical fiber
16 component
17 lateral surface
18 component
19 optical fiber
20 lateral surface
21 radiation direction
22 optical fiber
23 core
24 sheath
25 end face
26 optical fiber
27 core
28 sheath
29 taper
30 optical fiber
31 core 32 sheath
33 free end
34 scattering body
35 peripheral surface
36 end face
37 optical fiber
38 core
39 sheath
40 free end
41 scattering means
42 envelope surface
43 structure
45 component
46 manufacturing direction
47 mold
48 reinforcement fiber
49 mold beginning
50 mold end
51 optical fiber
52 end
53 gel zone

The invention claimed is:

1. A pultrusion method for producing an object formed at least partially from plastic material, the method comprising:
   guiding reinforcement fibers through a beginning of a mold into an interior of the mold, the reinforcement fibers embedded in liquid plastic material;
   introducing energy from at least one energy conductor into the fibers, each of the at least one energy conductor comprising an optical fiber, and the introduced energy causing the plastic material to solidify to form a solid object comprising the reinforcement fibers and plastic; and
   drawing the object out of the mold,
   wherein the at least one energy conductor is held in a fixed position with respect to the mold during said guiding, introducing, and drawing with an end of the at least one energy conductor extending through the mold beginning into the interior of the mold so that the fibers and plastic move past the at least one energy conductor, whereby the at least one energy conductor is not drawn along with the moving fibers and plastic, thereby not remaining as a component in the solid object.

2. The method as claimed in claim 1, wherein the at least one energy conductor is held at a point where the plastic is not yet solidified.

3. The method as claimed in claim 2, wherein the energy is introduced from a free end face of the at least one energy conductor.

4. The method as claimed in claim 1, wherein the energy is introduced from a free end face of the at least one energy conductor.

5. The method as claimed in claim 1, wherein the energy is introduced by a distributed emission from a lateral surface of the at least one energy conductor, and/or by scattering on structures of the at least one energy conductor.

6. The method as claimed in claim 1, further comprising supplying the energy conductor with the energy using electromagnetic radiation generated by at least one laser.

7. The method as claimed in claim 1, wherein the at least one optical fiber is held in the mold interior in such a manner that a free end of the at least one optical fiber is located shortly in front of a point at which the solidifying begins.

* * * * *